United States Patent [19]

Jones

[11] Patent Number: 5,250,314
[45] Date of Patent: Oct. 5, 1993

[54] THREE DIMENSIONAL FOOD PRODUCT FORMING APPARATUS AND METHOD

[75] Inventor: James E. Jones, Golden, Colo.

[73] Assignee: PRC, Englewood, Colo.

[21] Appl. No.: 884,646

[22] Filed: May 15, 1992

[51] Int. Cl.⁵ .............................. A23P 1/00; A22C 7/00
[52] U.S. Cl. .................................... 426/512; 425/259;
425/348 R; 425/398; 425/444; 425/546;
426/513
[58] Field of Search ................ 426/512, 513; 425/112,
425/259, 348 R, 398, 436 R, 440, 444, 447, 546,
572; 452/174; 264/299; 99/485

[56] References Cited

U.S. PATENT DOCUMENTS

| | | | |
|---|---|---|---|
| 2,981,973 | 5/1961 | Elmore | 426/513 |
| 3,633,245 | 1/1972 | Partos | 425/348 R |
| 3,728,136 | 4/1973 | Langlands | 426/513 |
| 3,820,449 | 6/1974 | Oickle | 99/485 |
| 3,851,355 | 12/1974 | Hughes | 425/572 |
| 4,097,961 | 7/1978 | Richards | 425/572 |
| 4,276,318 | 6/1981 | Orlowski et al. | 426/513 |
| 4,719,116 | 1/1988 | Crevasse | 426/315 |
| 4,872,241 | 10/1989 | Lindee | 426/513 |
| 5,074,778 | 12/1991 | Betts et al. | 425/398 |

*Primary Examiner*—George Yeung
*Attorney, Agent, or Firm*—Sheridan, Ross & McIntosh

[57] ABSTRACT

An apparatus and method for forming a three-dimensional food product. In one embodiment, a piston is reciprocally positioned within a forming cavity and includes a face which has a three-dimensional contour. An elastic membrane is positioned over the face of the piston to assist in the separation of the product therefrom. In this regard, when a raw food material is provided to the forming cavity, such material stretches the elastic membrane into substantial conformance with the contour of the piston face to thereby form at least one three-dimensional surface for the food product. When the forming cavity is positioned to discharge the product, the elasticity causes the membrane to contract to move the membrane away from the piston face and thereby eject the product from the forming cavity.

38 Claims, 12 Drawing Sheets

THREE DIMENSIONAL FOOD PRODUCT FORMING APPARATUS AND METHOD

FIELD OF THE INVENTION

The present invention generally relates to the field of food product forming apparatus and methods and, more particularly, to an apparatus and method for forming a three-dimensional food product from a raw food material which effectively ejects such formed product onto an appropriate product transfer system.

BACKGROUND OF THE INVENTION

Numerous machines are utilized in the food industry to transfer, form, and/or package a variety of food products. Specifically with regard to food product forming machines, factors such as production capacity, the consistency of the formed product (e.g., uniform weight), the appearance of the formed product (e.g., relating to the handling thereof, providing a desired end configuration), and waste reduction of raw food materials all have been given consideration in the development efforts relating to such machines. An example of one such machine is commonly referred to in the industry as a patty forming machine which produces, for instance, hamburger patties.

One general type of patty forming machine utilizes a rotatable turret which has a plurality of circumferentially-spaced cylinders for receiving the raw food material (e.g., hamburger) and an infeed manifold, positioned below the turret, for providing the raw food material to a given cylinder when rotated into alignment therewith. Moreover, a piston is reciprocally positioned within each cylinder and is advanced upwardly due to product pressure when the associated cylinder is rotated over the feed station. Consequently, the bottom surface of the piston and the walls of its associated cylinder define the configuration of the formed product. In the case of hamburger patties, the bottom surface of the piston is flat and perpendicular to the sidewalls of the circular cylinder such that the desired disc-shaped product is formed. When the cylinder having the disc-shaped product formed therein is rotated over a deposit area, such as a conveyor belt, the piston is advanced downwardly to eject the formed product from the cylinder. In order to assist in the complete separation of formed product from the face of the piston, the piston typically extends a certain distance below a bottom surface of the turret such that a separation assembly (e.g., a wire or the like) is advanced across the face of the piston to remove product therefrom. As can be appreciated, this type of separation assembly is suitable in the case where the face of the piston is substantially planar, but would not be effective if the face of the piston has a three-dimensional contour. U.S. Pat. Nos. 3,633,245 to Partos, issued Jan. 11, 1972, and 4,276,318 to Orlowski et al., issued Jun. 30, 1981, are generally representative of this type of patty forming machine Another type of patty forming machine generally includes a horizontally reciprocating slide plate having a plurality of cavities extending therethrough. The slide plate is horizontally advanced through a feed station where raw food material is forced down into each cavity through an opening in a plate which covers the upper end of each cavity. This raw food material is forced against a plate which closes the other end of each cavity. Consequently, the configuration of the formed product is determined by the shape of the perimeter of each cavity, which is typically circular, and the configuration of the upper and lower plates, which are typically substantially planar and perpendicular to the sidewalls of the cavity. Once a formed product is contained within each cavity, the slide plate is further horizontally advanced such that a punch, one of which is aligned with each cavity, may be driven downwardly to eject the formed product from the cavities upon an appropriate deposit area. U.S. Pat. No. 4,097,961 to Richards, issued Jul. 4, 1978, is generally representative of this type of patty forming machine.

Another type of patty forming machine generally includes a rotatable wheel having a plurality of spaced cavities positioned on a peripheral surface thereof. A freely reciprocable piston is positioned within each cavity and has an outer surface for contacting product which generally follows the contour of the rotatable wheel. In this regard, a feed station provides a raw food material to each cavity when rotated into alignment therewith which forces the piston upwardly within the cavity. The configuration of the product is thus again defined by the perimeter of each cavity and the face of the piston therein. Notwithstanding the slight, convexly arcuate contour of each piston, the formed product remains substantially a disc-shaped, two dimensional product. As each cavity containing a formed product is rotated over an appropriate deposit area such as a conveyor belt, the piston is urged radially outward such that the formed product is ejected from the cavity. U.S. Pat. No. 3,851,355 to Hughes, issued Dec. 3, 1974, is generally representative of this type of patty forming machine.

Although the above-identified types of patty forming machines are suitable for forming two-dimensional products such as hamburger patties, in certain instances it is desirable for the product formed from a raw food material to assume the configuration of the food product in its "natural state." For instance, in the case where chicken portions are utilized as the raw food material, it may be desirable for such portions to be formed into the shape of, for instance, a chicken breast. Moreover, in the case where fish portions are utilized as the raw food material, it may be desirable for such portions to be formed into the shape of a fillet. U.S. Pat. No. 3,728,136 to Langlands, issued Apr. 17, 1973, generally discloses one type of a product forming machine which accommodates for the formation of at least one type of three-dimensional food product.

Langlands is directed to a process and apparatus for shaping a three-dimensional product in a single forming station. Generally, a rectangular block of frozen fish is positioned on a supporting surface and a die having a three-dimensional configuration is pressed downwardly over the frozen fish to conform such to the shape of the die. In order to assist in the removal of the formed frozen fish product from the die, a sheet of flexible material is positioned across the die cavity prior to engagement with the frozen fish. This flexible material extends between a supply and take-up roll. Consequently, when the die is forced down upon the frozen block of fish, apparently additional flexible material is taken from the supply roll such that the flexible material is able to conform to the contour of the die. In order to eject the product from the die, air may be directed against the flexible material to force it away from the die. Moreover, the flexible material may be moved relative to the die to also eject the formed product from the die. In the latter case, Langlands indicates that the air ejection system need not be utilized.

Notwithstanding the foregoing, there remains a need for a machine capable of producing a three-dimensional food product from a variety of types of raw food materials in a variety of conditions. Moreover, there remains a need for such a machine which includes a simplified means for ejecting the formed three-dimensional product onto a given deposit area. Furthermore, there remains a need for such a machine which has high production capabilities. Relatedly, there remains a need for such a machine which is able to accurately and consistently eject the formed three-dimensional product onto a predefined portion of a deposit area.

SUMMARY OF THE INVENTION

The present invention is generally an apparatus and method for forming a three-dimensional food product from a source of a raw food material. In one aspect, the three-dimensional food product is formed by a mold which is positioned in a forming station for receiving the raw food material. At least a portion of the mold has a three-dimensional contour to define at least one three-dimensional surface for the food product. Other surfaces of the food product may be defined by the configuration of the forming station which contains the mold (e.g., the perimeter of the forming station may be configured to define the perimeter of the food product). A substantially elastic membrane is also positioned over the mold to assist in the separation of the formed product therefrom. In this regard, when the raw food material is provided to the forming station, the elastic membrane stretches to substantially conform to the contour of the mold, and thereby forms at least one three-dimensional surface for the food product. The elastic membrane also at least assists in the ejection of the formed food product from the mold at a desirable time due to the inherent properties of the elastic material. In order to assist in the retention of the formed product within the mold until the desirable time, however, such as when the forming station and mold are positioned over an appropriate product discharge area (e.g., product transfer system), a vacuum may be drawn through the forming station assembly on the opposite side of the elastic membrane from the raw food material.

In another aspect of the present invention, the three-dimensional food product is formed in a high production capacity by an apparatus which generally includes an infeed manifold for containing a raw food material and a rotatable turret having a plurality of forming stations circumferentially positioned about a rotational axis of the turret and alignable with the infeed manifold. Each forming station includes a forming cavity for receiving a quantity of raw food material when rotated into alignment with the infeed manifold and a piston which is positioned therewithin. At least a portion of the face of the piston has a three-dimensional contour and a membrane is positioned at least over this contoured portion of the face of the piston. Raw food material provided to the forming cavity thus causes the membrane to substantially conform to the face of the piston, and thereby forms at least one three-dimensional surface for the product. The membrane also thereafter assists in separating the food product from the face of the piston, for instance when the turret is rotated over a discharge area. In order to assist in the ejection of the formed food product from the piston, forced air and/or a reciprocable plunger may exert a force on the membrane to force such away from the piston face, thereby assisting in the ejection of the formed product from the mold. In the case where the reciprocable plunger is used, the face of the plunger may be configured to conform with the three-dimensional contour of the mold.

One embodiment which incorporates all aspects of the present invention generally includes an infeed manifold for providing a raw food material to a rotatable turret positioned vertically above the infeed manifold. A plurality of circumferentially-spaced forming cavities or cylinders, each having a piston reciprocally positioned therein, are rotated into alignment with the infeed manifold to receive pressurized raw food material therefrom and to form the three-dimensional food product. In this regard, the portion of the piston which faces the incoming raw food material has a three-dimensional contour over at least a portion thereof. Moreover, a substantially elastic membrane is positioned over the face of the piston in order to assist in the formation and separation of the finished food product from the face of the piston. More particularly, when a given forming station is rotated into alignment with the infeed manifold, raw food material is provided to the forming cavity under pressure which causes the elastic membrane to stretch into conformance with the contour of the face of the piston, which thereby forms at least one three-dimensional surface for the finished food product. Once the turret is rotated to move such forming station out of alignment with the infeed manifold, the food product is completely formed. Thereafter, the elastic membrane contracts and the food product is ejected from the forming cavity, preferably when positioned over an appropriate discharge area such as a conveyor belt.

The above-identified embodiment of the present invention may incorporate a number of additional features to further assist in the formation and/or ejection of the three-dimensional food product. For instance, the piston may incorporate a plurality of apertures such that prior to rotating the forming station over the infeed manifold, a vacuum may be drawn such that the membrane will be retained against the piston face to reduce the potential for the membrane catching/tearing during this rotation. Moreover, this vacuum may be retained and/or subsequently drawn prior to rotating the forming station out of alignment with the infeed manifold to effectively retain the formed product within the forming cavity and against the face of the piston until release of the product is desired. In order to improve upon the accuracy when ejecting the formed product onto, for instance, a conveyor belt, air may be injected through the above-defined apertures in the piston to assist in the movement of the elastic membrane away from the piston face to thereby eject the formed product from the forming cavity. Furthermore, a plunger may be reciprocally positioned within each piston head to also assist the elastic membrane in such movement. In this case, a portion of the face of the plunger may assume a configuration which forms part of the three-dimensional contour of the piston face.

DETAILED DESCRIPTION

Figure 1:
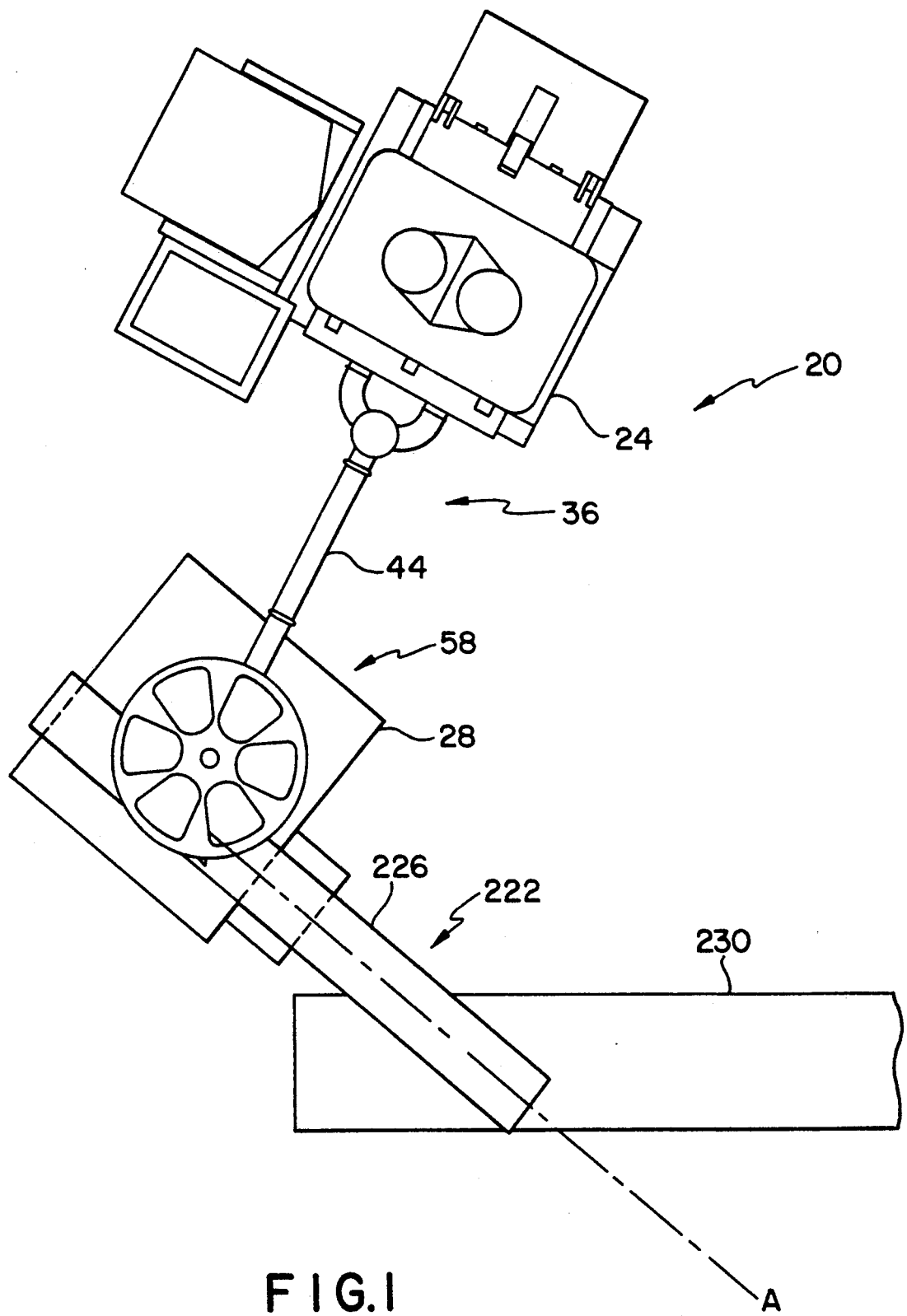
FIG. 1 is a general schematic view of a product formation system which may incorporate/utilize the three-dimensional food product forming apparatus and method of the present invention.

The present invention will be described with reference to the accompanying drawings which assist in illustrating the pertinent features thereof. Generally and in the case of the product forming system 20 of FIG. 1, raw food material is provided to the product former 28 of the present invention by a product pump 24. The product former 28 shapes/molds a product from such raw food material into a desired three-dimensional contour as will be discussed in more detail below, and thereafter successively provides such products to a product transfer system 222. More particularly, the product former 28 deposits the three-dimensional products onto a spreader conveyor 226, interconnected with the product former 28, which thereafter deposits such products onto a processing belt 230 for delivery to subsequent processing/packaging systems.

Figure 2:
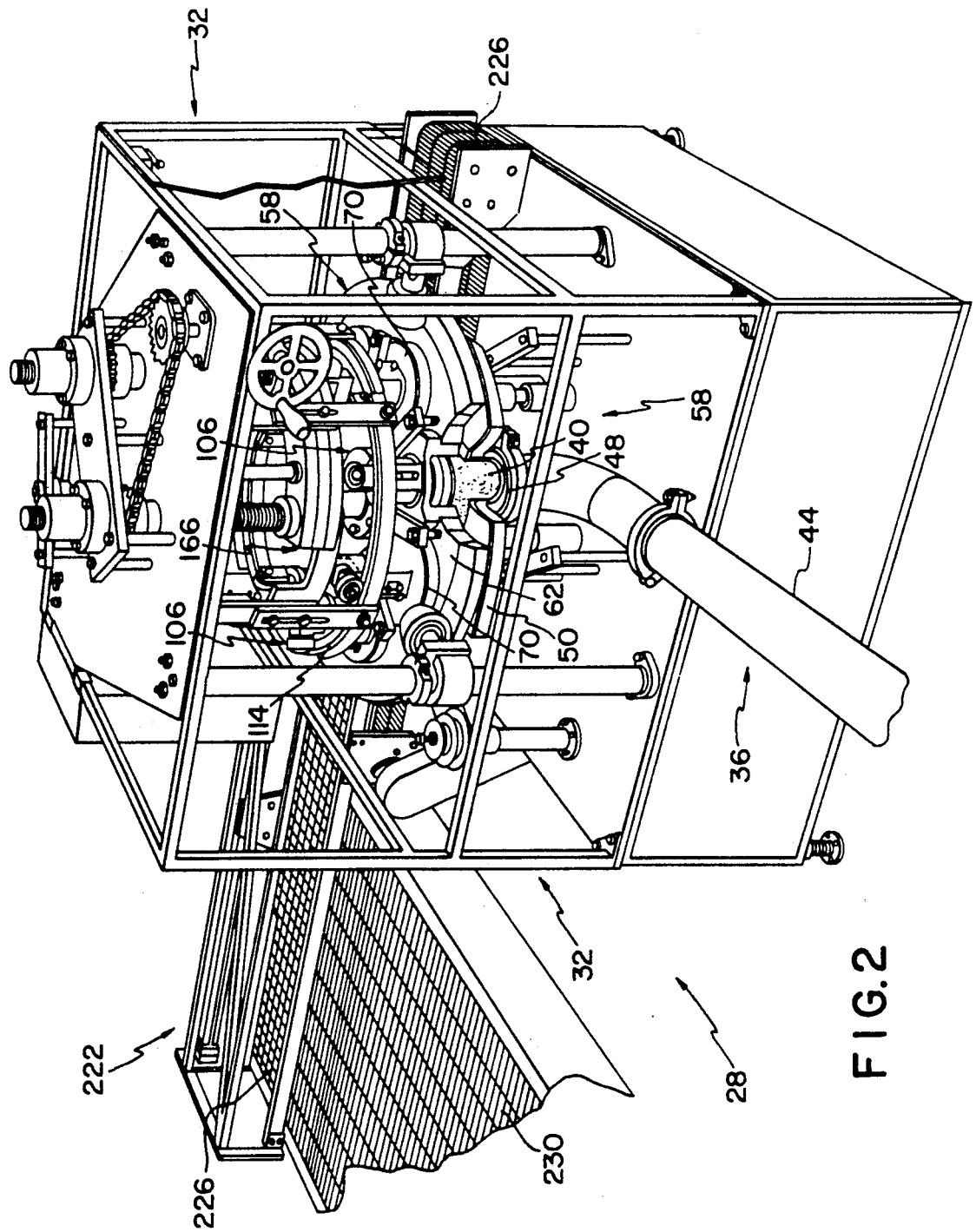
FIG. 2 is a perspective view of one embodiment of the three-dimensional product former of the present invention.
Figure 3:
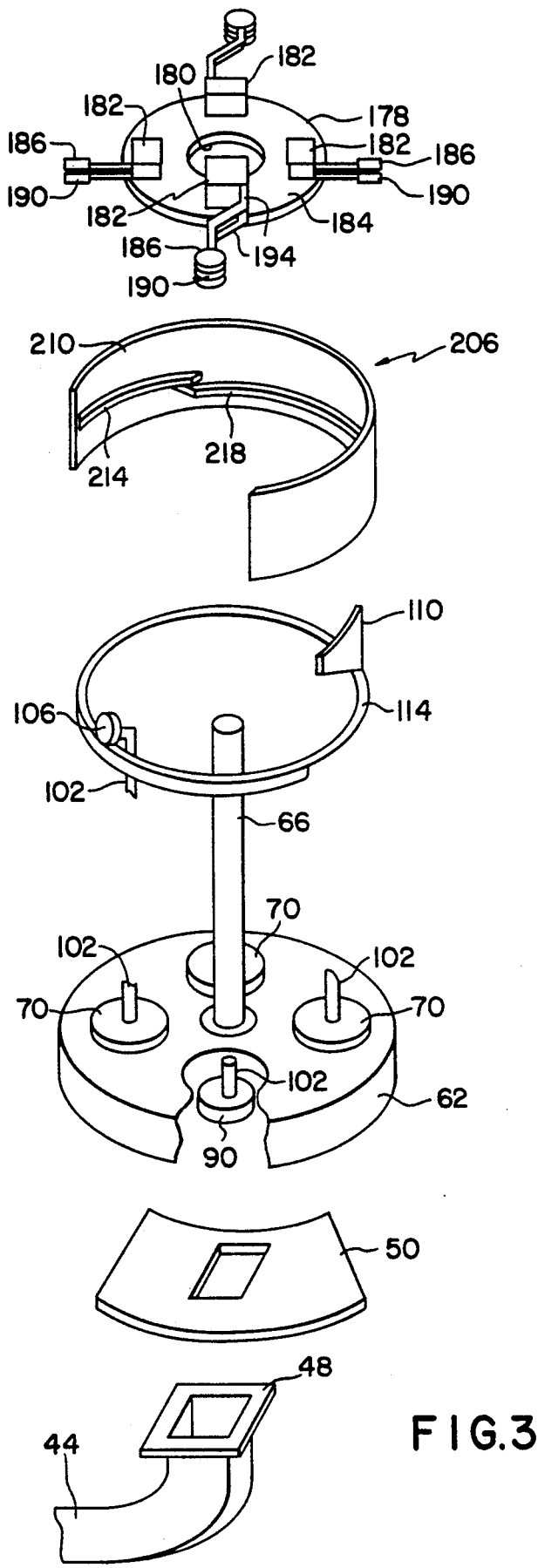
FIG. 3 is an exploded, perspective view of certain portions of the product former of FIG. 2.

One embodiment of the present invention is more particularly illustrated in FIGS. 2-3. As noted above, the product former 28 produces three-dimensional food products from a raw food material and positions such products onto a discharge area in a desirable manner. In this regard, the product former 28 has a frame assembly 32 which supports its various components, including a feed and forming assembly 36, 58. The feed assembly 36 provides the raw food material 40 to the forming assembly 58 which shapes/molds such material 40 into a product having a desired three-dimensional configuration. More particularly, the forming assembly 58 includes a rotating cavity plate 62 having a plurality of circumferentially-spaced forming stations 70 attached thereto. When a particular forming station 70 is rotated over the feed assembly 36, raw food material 40 is provided to such forming station 70 and a single three-dimensional food product is desirably shaped/molded therein. Upon further rotation of the cavity plate 62 to position the identified forming station 70 over the spreader conveyor 226, the product is effectively ejected therefrom onto the spreader conveyor 226 which thereafter deposits such products onto the processing belt 230. In this regard, the spreader conveyor 226 and product former 28 may assume a variety of orientations relative to the processing belt 230 depending upon a number of factors, as illustrated by the differing orientations of FIGS. 1 and 2.

The feed assembly 36 provides the raw food material to the forming assembly 58 and includes an infeed pipe 44. One end of the infeed pipe 44 is connected to an appropriate product pumping apparatus (e.g., the product pump 24 of FIG. 1), while the other end is connected to an infeed manifold 48 which is positioned below the rotatable cavity plate 62 of the forming assembly 58. An upper portion of the infeed manifold 48 is aligned with an opening in a stationary seal plate 50 which slidably engages with the rotating cavity plate 62. This opening is vertically alignable with each forming station 70 on the cavity plate 62. Consequently, when each forming station 70 is rotated over the infeed manifold 48, raw food material is forced under pressure into each such forming station 70 to form the three-dimensional food product therein. In order to assist in the separation of the raw food material from the formed product now contained within the given forming station 70, a knife cut-off is positioned on a peripheral portion of the seal plate 50 or the infeed manifold 48. Therefore, as each forming station 70 rotates out of alignment with the infeed manifold 48, the knife cut-off effectively severs the raw food material from the formed product.

The forming assembly 58 is interconnected with the feed assembly 36 to receive the raw food material therefrom and shape/mold such raw food material into a three-dimensional food product. More particularly, a plurality of forming stations 70 are circumferentially spaced on and connected to the rotatable cavity plate 62 which is typically rotated at a relatively high speed (e.g., up to 50 RPM) by a central drive shaft 66. The central drive shaft 66 interconnects the cavity plate 62 to an appropriate drive source (not shown) such that the product former 28 is able to move each of the forming stations 70 at a desirable rate between the infeed manifold 48, where the raw food material is provided to and the product is formed in the given forming station 70, and the spreader conveyor 226, where such product is deposited for delivery to processing/packaging apparatus (not shown).

Figure 4:
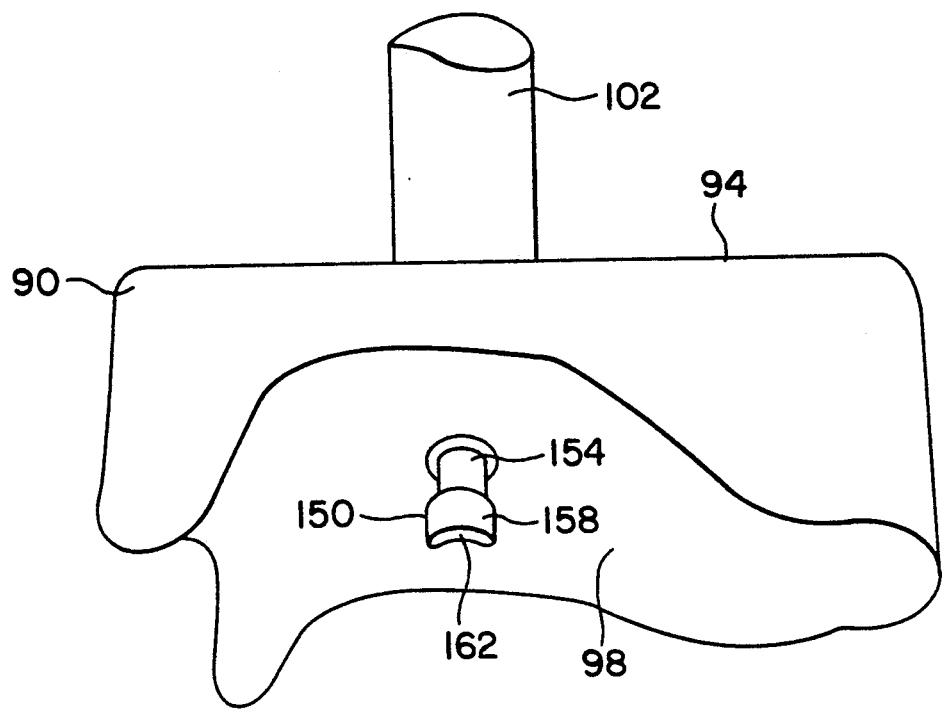
FIG. 4 is a perspective view of one embodiment of a piston having a reciprocable ejection plunger.
Figure 5:
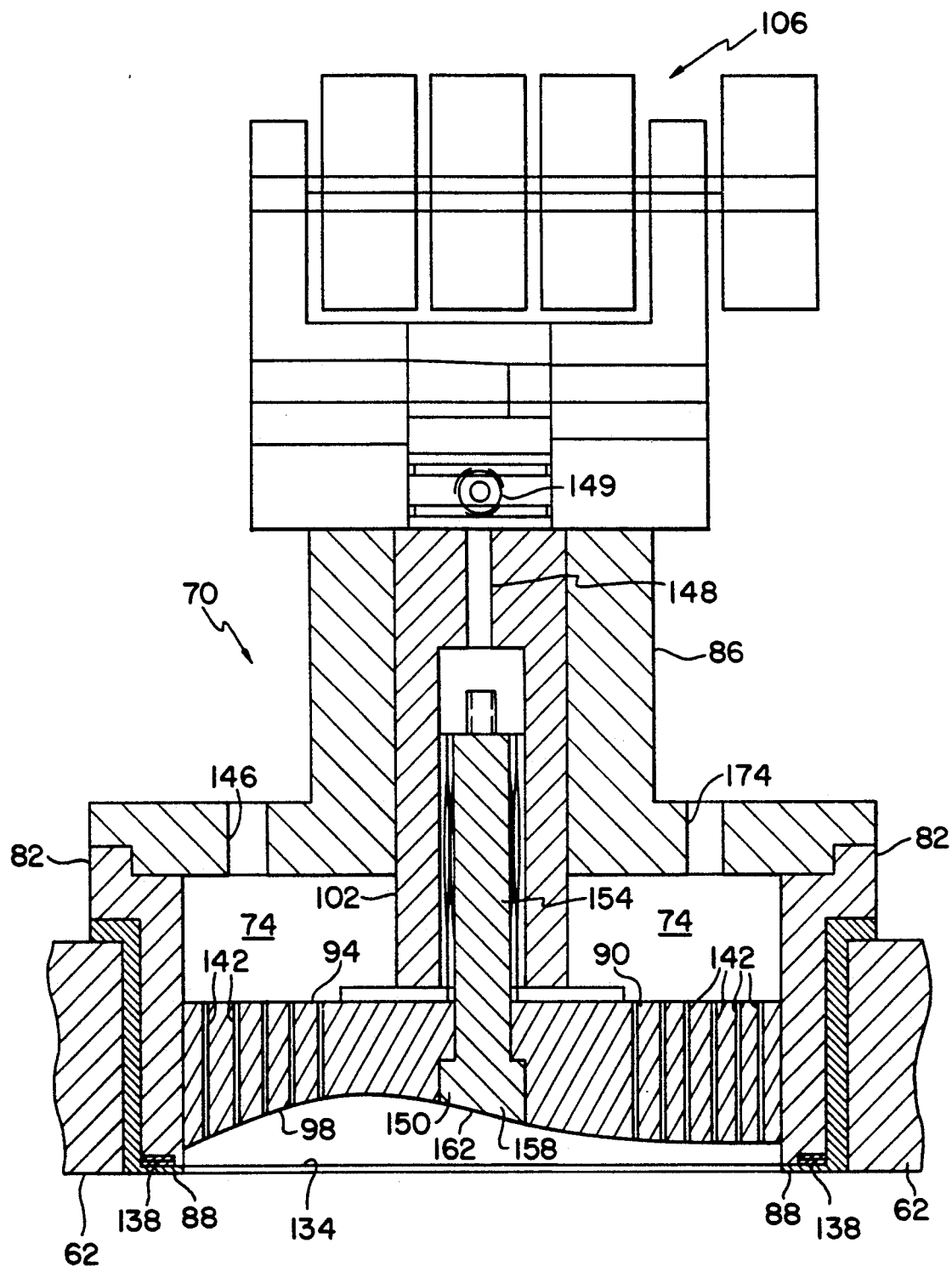
FIG. 5 is a longitudinal cross-sectional view of one embodiment of a forming station.

A three-dimensional product is shaped/molded in each of the forming stations 70 during rotation of the cavity plate 62 in the above-described manner. As illustrated in FIGS. 4-5, each forming station 70 includes a forming cavity 74 which is generally defined by a cavity cap 86 and a sleeve 82, and a piston 90. The piston 90 is typically reciprocally positioned within the forming cavity 74, but such is not required by the present invention since the piston 90 may in fact function as a substantially stationary mold in shaping/molding the desired three-dimensional food products. Although the general shape of the perimeter of the forming cavities 74 may be substantially circular, those skilled in the art will appreciate that such may assume a variety of configurations to produce a desired perimeter configuration for the food product if desired. Nonetheless, the perimeter of the piston 90 will generally match the shape of the perimeter of its respective forming cavity 74. Consequently, in the event that the piston 90 is contoured to form a chicken breast, the forming cavity 74 will generally assume its peripheral configuration.

In the event that the pistons 90 are reciprocally positioned within the forming cavities 74, such reciprocation may be used to provide a variety of functions. For instance, reciprocation of the pistons 90 within the respective forming cavities 74 may be used to control the formation of the product and/or the ejection of such product from the forming cavity 74. More particularly, the flow of raw food material into a forming cavity 74 when aligned with the infeed manifold 48 may be used to force its associated piston 90 upwardly within the forming cavity 74. By providing the raw food material to a forming cavity 74 in this manner, a more consistent food product (e.g., weight) may be obtained, versus actually driving the piston 90 upwardly within the forming cavity 74 to draw or suck raw food material therein, although such is within the scope of the present invention. Although the amount of such upward movement may vary from application to application (e.g., the stroke is set for a given product run), in typical applications the stroke of the piston 90 is often less than one inch in producing many three-dimensional products. Control of this vertical positioning of the piston 90 is desirable and serves to maintain exact volumes between each formed product. This equates to very close tolerance between the weights of each formed product, typically $\pm \frac{1}{2}\%$ total weight Reciprocation may also be used in the ejection of the product from the forming cavity 74. For instance, once the cavity plate 62 has rotated a certain degree, a push down cam 110 may lower the piston 90 within a forming cavity 74 having a product contained therein, namely by engaging a roller assembly 106 attached to the upper end of the piston shaft 102 and generally forcing such in a downward direction. This motion of the piston 90 coincides with the ejection of the product from the forming cavity 74 onto the spreader conveyor 226. A lift cam 114 may thereafter sufficiently raise the piston 90, again by engagement with the roller assembly 106 of the particular piston 90, to a proper position for rotation over the infeed manifold 48 to allow for repetition of the described cycle.

As can be appreciated, the extent of the upward travel of each piston 90 within the forming cavities 74 controls the amount of raw food material within each forming cavity 74, and thus the weight of the three-dimensional product. In order to allow for modification of the amount of raw food material within each forming cavity 74, the present invention may incorporate an adjustable portion control assembly 166 as generally illustrated in FIG. 2. The portion control assembly 166 is vertically aligned with each forming station 70 when positioned over the infeed manifold 48 and may be vertically adjusted relative to the cavity plate 62, and thus each forming station 70. Consequently, the portion control assembly 166 engages an upper portion of the roller assembly 106 for the aligned piston 90, and thus terminates further upward movement of such piston 90 within its forming cavity 74 to thereby regulate the amount of raw food material provided to the forming cavity 74.

The face 98 of the piston 90 generally defines the shape of the product, although in some cases the lower, perimeter portion of the food product may be actually defined by the sleeve 82 of the forming cavity 74. More particularly, the face 98 of the piston head 94 which interacts with the raw food material 40 has a three-dimensional contour (e.g., concavely-shaped) as illustrated in FIGS. 4–5 such that three-dimensional food products may be shaped/molded within each forming cavity 74. Since the contour of the piston face 98 has this three-dimensional contour, however, existing devices which assist in the separation of the formed food product from the piston face 98 will not be effective. For instance, the prior art separation system 286 illustrated in FIGS. 7–8 does not provide an effective alternative for this function in this case.

Figure 7:
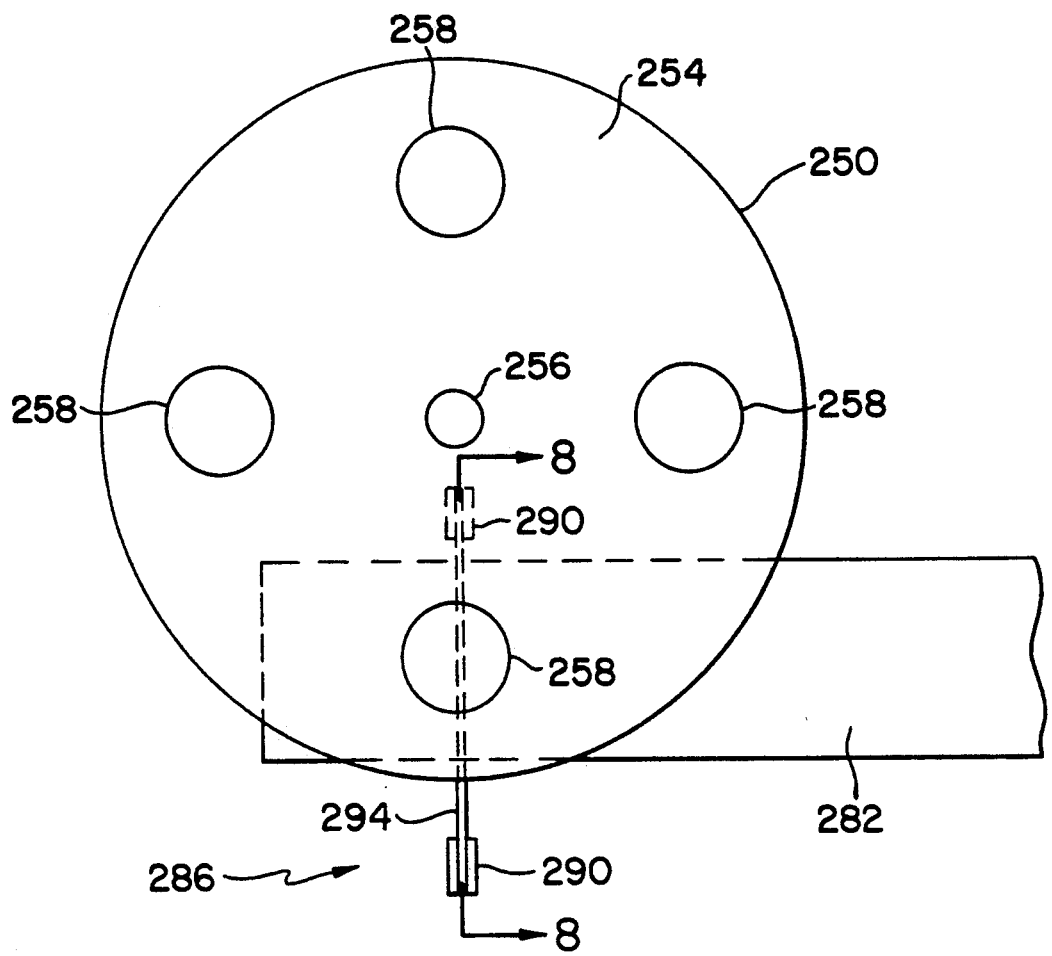
FIG. 7 is a top view of a prior art product separation system used with a turret-type patty forming machine.
Figure 8:
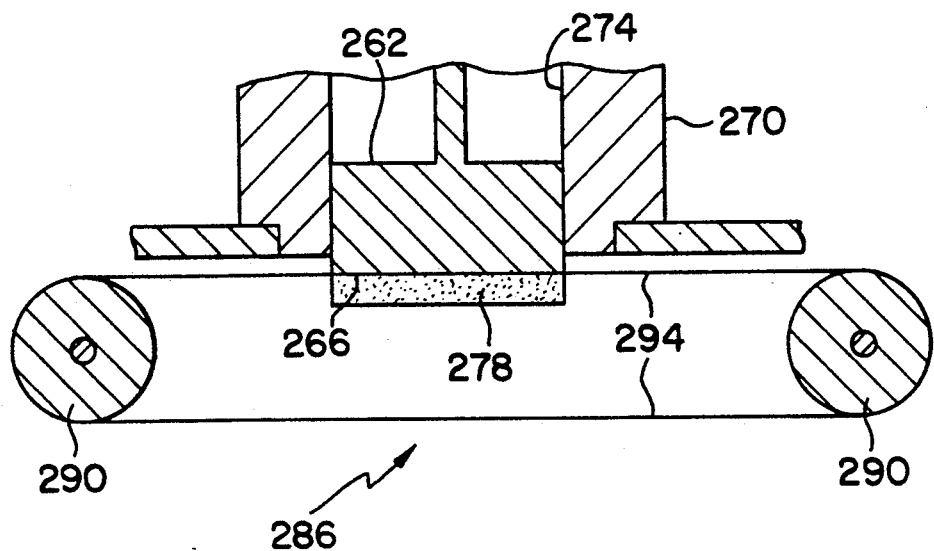
FIG. 8 is a cross-sectional view of the machine of FIG. 7 taken along line 8—8.
Figure 9A:
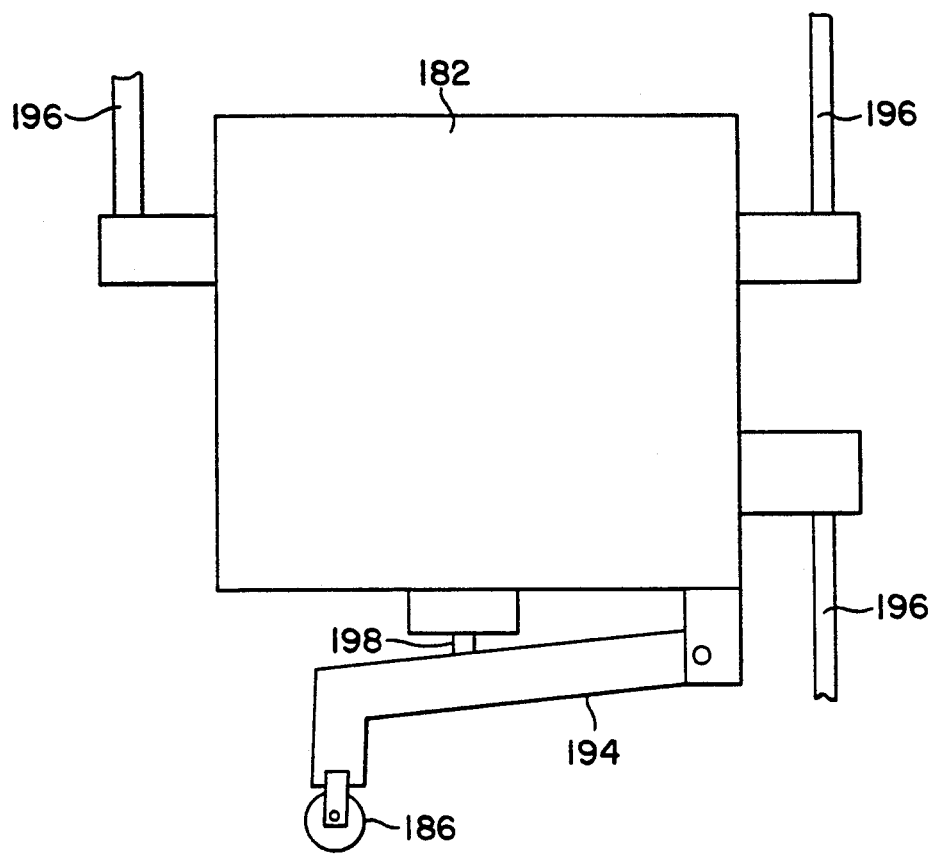
FIG. 9A is a top view of one station of the control harness of FIG. 3.
Figure 9B:
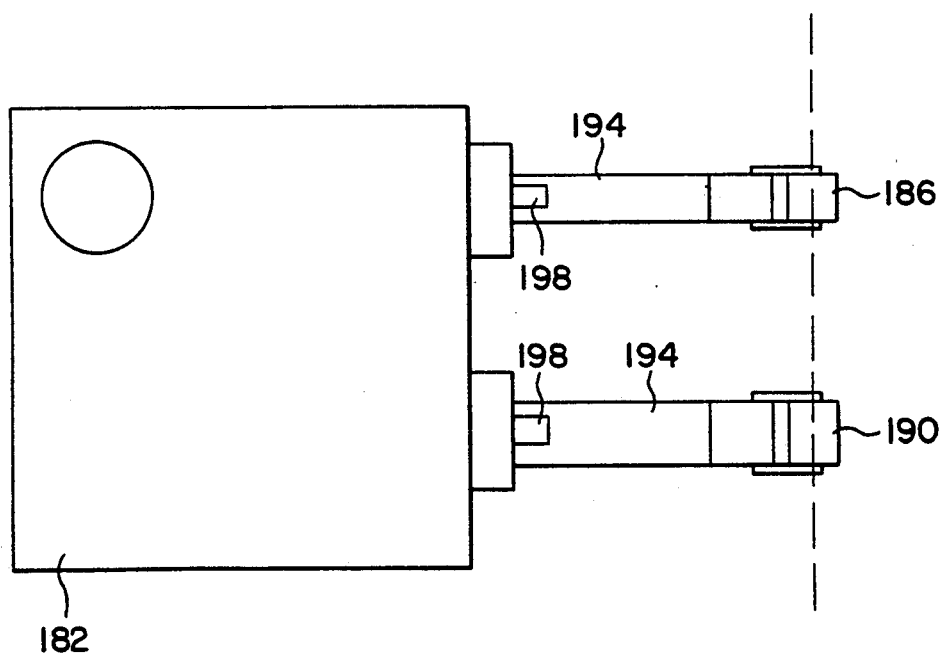
FIG. 9B is a side view of the station of FIG. 9A.
Figure 10:
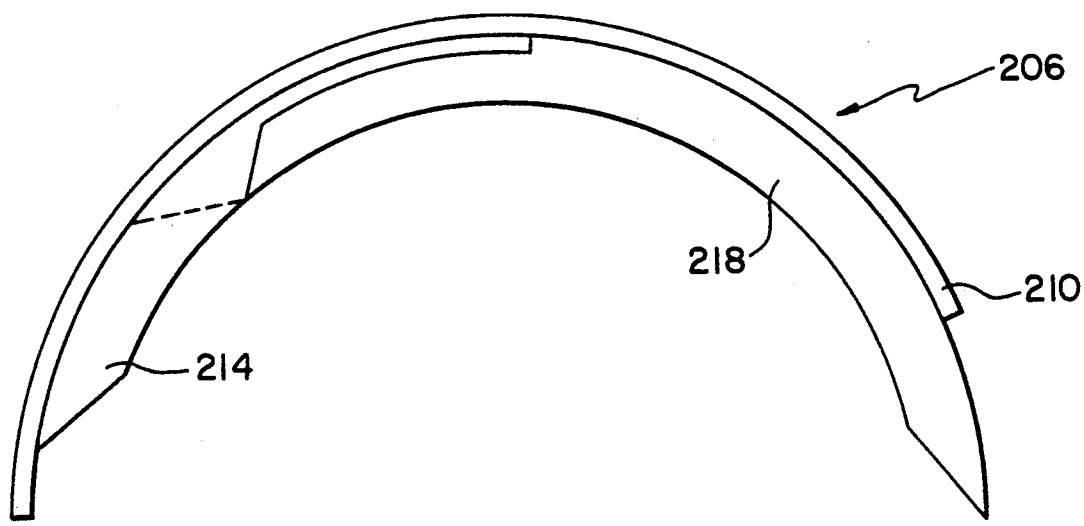
FIG. 10 is a top view of one embodiment of the air/vacuum cam assembly.
Figure 11:
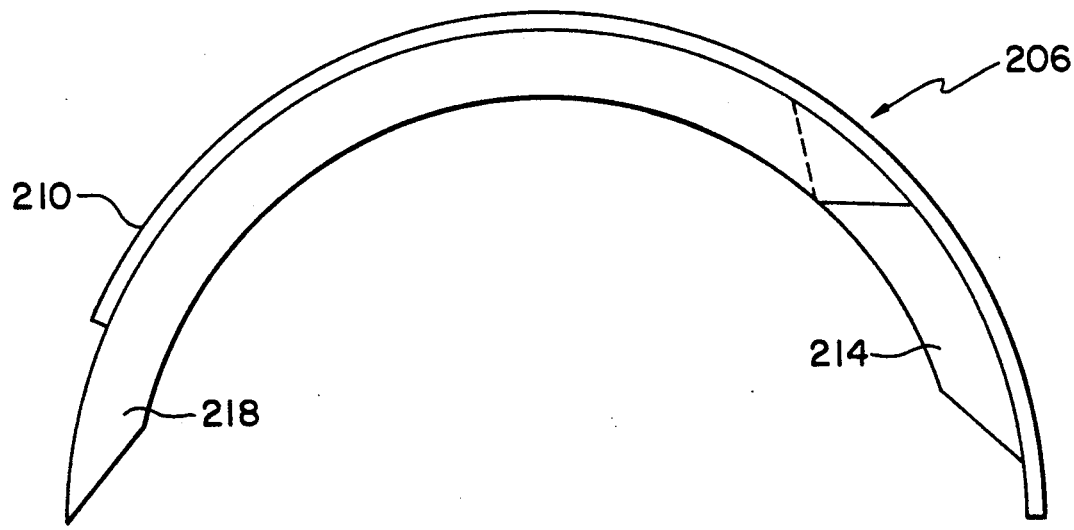
FIG. 11 is a bottom view of the air/vacuum cam assembly of FIG. 10.

The separation system 286 of FIGS. 7–8 is used in conjunction with a patty forming machine 258 which includes a rotatable turret 254 and a plurality of patty forming stations 258, each having a piston 262 reciprocally positioned therein. The face 266 of the piston 262 is planar and perpendicular to the sidewalls 274 of the cylinder 270 in order to form the desired two-dimensional, disc-shaped hamburger patty 278. In order to assist in the separation of the patty 278 from the piston face 266, the separation system 286 is positioned above a conveyor belt 282 and includes a wire 294 which is positioned around two displaced pulleys 290, one or both of which may be rotatably driven (not shown). Consequently, when a given patty forming station 258 is rotated toward the conveyor belt 282, the piston 262 is driven downwardly a certain distance below the bottom of the turret 254. Therefore, the wire 294 is able to engage the piston face 266 as it advances thereby to assist in the separation of the hamburger patty 278 from the piston face 266. Since the piston face 266 is substantially planar in this case, this type of product separation is quite effective. However, in the event that a three-dimensional contour is used as in the case of the piston face 98 associated with the present invention, it can be appreciated that it would be difficult and/or impractical to incorporate a system similar to the separation system 286 of FIGS. 7–8.

Figure 6:
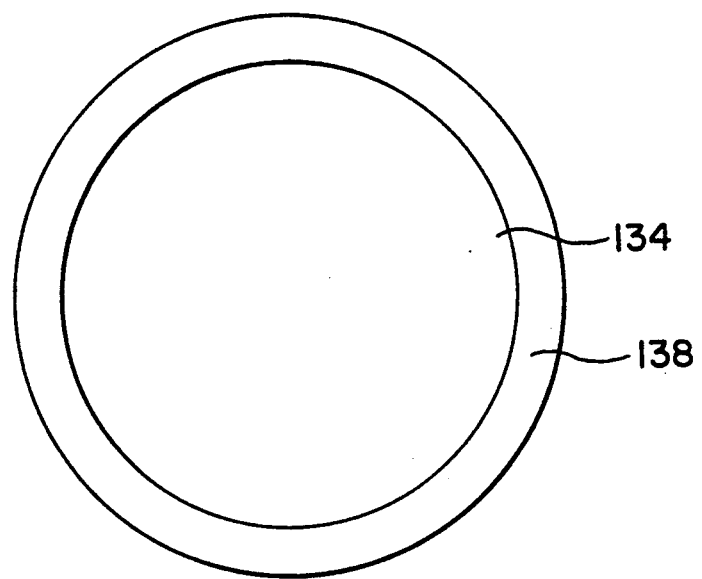
FIG. 6 is a top view of one embodiment of a membrane for interacting with the face of the piston.

In order accommodate for the desired three-dimensional contour of the piston face 98 and the continuing need to appropriately separate the formed product from the piston face 98 to provide such product to the spreader conveyor 226 for subsequent processing/packaging, the present invention incorporates a membrane 134 which is positioned over the piston face 98 as illustrated in FIGS. 5–6. A mounting ring 138 is secured to a peripheral portion of the membrane 134 and may be positioned between an end of the sleeve 82 and a retainer clip 88 in order to effectively secure the membrane 134 to a bottom portion of the forming cavity 74. The mounting ring 138 thus remains substantially stationary relative to the membrane 134 during the provision of raw food material to each forming cavity 74 as will be discussed below.

The membrane 134 directly interacts with the raw food material when provided to the forming cavity 74, and thus must be formed from an FDA-approved material Moreover, the interaction between the membrane 134 and the formed product must be such that the product is easily separable therefrom (i.e., the product should not stick to the membrane 134). Furthermore, the membrane 134 must be sufficiently flexible/pliable so as to substantially conform to the contour of the piston face 98 when forced thereagainst by the pressure of the raw food material from the infeed manifold 48 to provide the desired three-dimensional configuration for the product. Therefore, the membrane 134 may be formed from materials such as urethane, neoprene, nitrile or PVC, and is preferably formed from polyisoprene rubber.

The membrane 134 not only provides for a reduced frictional interaction between the piston face 98 and the food product, but it may be formed from a material which assists in the ejection of the product from the forming cavity 74 when positioned over the spreader conveyor 226. In this regard, the membrane 134 is preferably formed from a substantially elastic material, such as the above-identified polyisoprene rubber. Consequently, when raw food material is provided to a given forming cavity 74, the raw food material may not only force the piston 90 upwardly therewithin (if a reciprocable interaction is utilized), but also forces the membrane 134 to stretch into conformance with the three-dimensional contour of the piston face 98 such that tensioning forces are generated within the membrane 134 itself. These built-in tensioning forces may thus be used to eject the product when a given forming station 70 is rotated over the spreader conveyor 226. More particularly, the inherent properties of the elastic material produces a self-contracting effect such that the membrane 134 moves away from the piston face 98 to eject the product at the desired time. Therefore, an external system is not required to achieve the desired ejection.

In the event that the seal plate 50 terminates prior to a given forming station 70 being positioned over the spreader conveyor 226 for ejection of the product, as illustrated in FIG. 2, it may be necessary to incorporate a vacuum assist system. Generally, this system draws a vacuum within each forming cavity 74 at the appropriate time to retain the membrane 134 against the piston face 98, which thereby retains the product within the forming cavity 74 until the required/desired ejection time. This may be provided by incorporating a vacuum hole 174 which extends through the cavity cap 86 as illustrated in FIG. 5 and which would be interconnected with an appropriate vacuum pump (not shown). Moreover, a plurality of preferably pin-hole-sized apertures 142 may extend through the entire piston head 94. Consequently, at any time prior to the bottom of the cavity plate 62 disengaging the seal plate 50, a vacuum may be drawn to retain the membrane 134, and thus the food product, in the desired position. When the forming station 70 is rotated over the spreader conveyor 226, the vacuum may then be released such that the product will be ejected from the forming cavity 74. Although the vacuum may be controlled in a variety of manners, the control harness 178 and air/vacuum cam assembly 206 provides for an effective control of this feature as will be discussed below.

When a forming station 70 is positioned over the spreader conveyor 226 and the vacuum is released as described, the membrane 134 will eject the formed product from the forming cavity 74 onto the spreader conveyor 226, particularly if formed from an elastic material as noted above. Notwithstanding the effectiveness of the elastic membrane 134 for this purpose, under some circumstances it may be desirable for the food product to consistently assume a particular position on the separator 226, such as about the centerline A of the spreader conveyor 226 of FIG. 1. In order to increase the accuracy of the depositing of the product onto a specific location of the spreader conveyor 226, the present invention may incorporate a number of features to assist the membrane 134 in moving away from the piston face 98 to thereby eject the product from the forming cavity 74 in a desired manner.

In one embodiment, a forced-air system is utilized and may include an air-eject hole 146 in the cavity cap 86 as illustrated in FIG. 5. Air may thus be provided through the air-eject hole 146 by an appropriate source (not shown) when the forming station 70 is in a certain position such that the air will then flow through the plurality of the above-identified apertures 142 in the piston head 94. This flow of air will thus act on the membrane 134 and assist such in its movement away from the piston face 98, which thus assists in the ejection of the formed product from the forming cavity 74.

In another embodiment, a plunger 150 may be reciprocally positioned within the piston 90 as illustrated in FIG. 4-5. When the plunger 150 is in a first position, its face 162 forms a portion of the three-dimensional contour of the piston face 98 as illustrated in FIG. 5. However, when a given forming station 70 is rotated over the spreader conveyor 226, the plunger 150 may be activated by the forced-air system or an appropriate alternative drive system to downwardly advance the plunger 150 relative to the piston 90 to a second position as illustrated in FIG. 4 such that the face 162 of the plunger 150 exerts a force on the membrane 134 to assist in the movement thereof away from the piston face 98. An appropriate return mechanism such as a spring may then be used to return the plunger 150 to its original position. Depending upon a variety of considerations, it may be desirable to use the plunger 150 and/or the above-described air ejection alternative either individually or in combination.

Although the above-discussed vacuum assist system and forced-air system may be provided in a variety of manners, in one embodiment all of such are pneumatically controlled/activated. In this regard, a control harness 178 is positioned upon and rotates with the central drive shaft 66 and interacts with an air/vacuum cam assembly 206 as illustrated in FIGS. 3, 9A-B, and 10-11. The air/vacuum cam assembly 206 includes a housing 210 which may be appropriately attached to the frame assembly 32 or another appropriate supporting structure. The forced-air and vacuum-assist cams 214, 218 are mounted on the housing 210 for interaction with the control harness 178.

The control harness 178 generally includes a number of control stations 182 which coincide with the number of forming stations 70 and which are positioned on a mounting plate 184 having a hole 180 therethrough for interacting with the central drive shaft 66. Each control station 182 includes a forced-air roller 186 and a vacuum-assist roller 190. When the central drive shaft 66 and thus the cavity plate 62 rotates during operation of the product former 28, the vacuum-assist roller 190 associated with a given forming station 70 is pivoted inwardly when engaged with the vacuum-assist cam 218. The pivot arm 194 of this roller 190 thereby compresses a switch 198 which initiates the vacuum pump (not shown) to draw a vacuum in the above-described manner. When the forming station 70 approaches the spreader conveyor 226, the vacuum-assist roller 190 disengages the vacuum-assist cam 218, and thus pivots out of substantial contact with the associated switch 198, which terminates the vacuum draw in the given forming cavity 74. Substantially simultaneously therewith, the forced-air roller 186 engages the forced-air cam 214 and is pivoted to initiate the application of forced air into the given forming station 70. In the event the air-eject hole 146 is utilized, this air will enter the associated forming cavity 74 through the air-eject hole 146 and will flow through the apertures 142 to move the membrane 134 in the above-described manner. In the event that the plunger 150 is utilized, this air may flow through the plunger air inlet 149 through a plunger air hole 148 to exert a force on an upper portion of the plunger 150 to drive it downwardly to move the membrane 134 in the above-described manner. In providing this air and/or vacuum capabilities, a plurality of hoses 196 may be incorporated on the control harness 178 for interconnection with the forced-air and vacuum supplies, as well as for interconnection with the associated forming station(s) 70.

The general operational sequence of the product former 28 of the present invention is generally illustrated in FIGS. 12A-D. As noted above, the pistons 90 need not necessarily be reciprocally positioned within the forming cavities 74, but instead may be substantially stationary. Moreover, the air-ejection system and/or the ejection plunger 150 need not necessarily be utilized in the event that the membrane 134 is formed from a substantially elastic material. Therefore, for simplicity of illustration the piston 90 of FIGS. 12A-D does not reciprocate and only utilizes the membrane 134 for ejection of the food product.

Figure 12A:
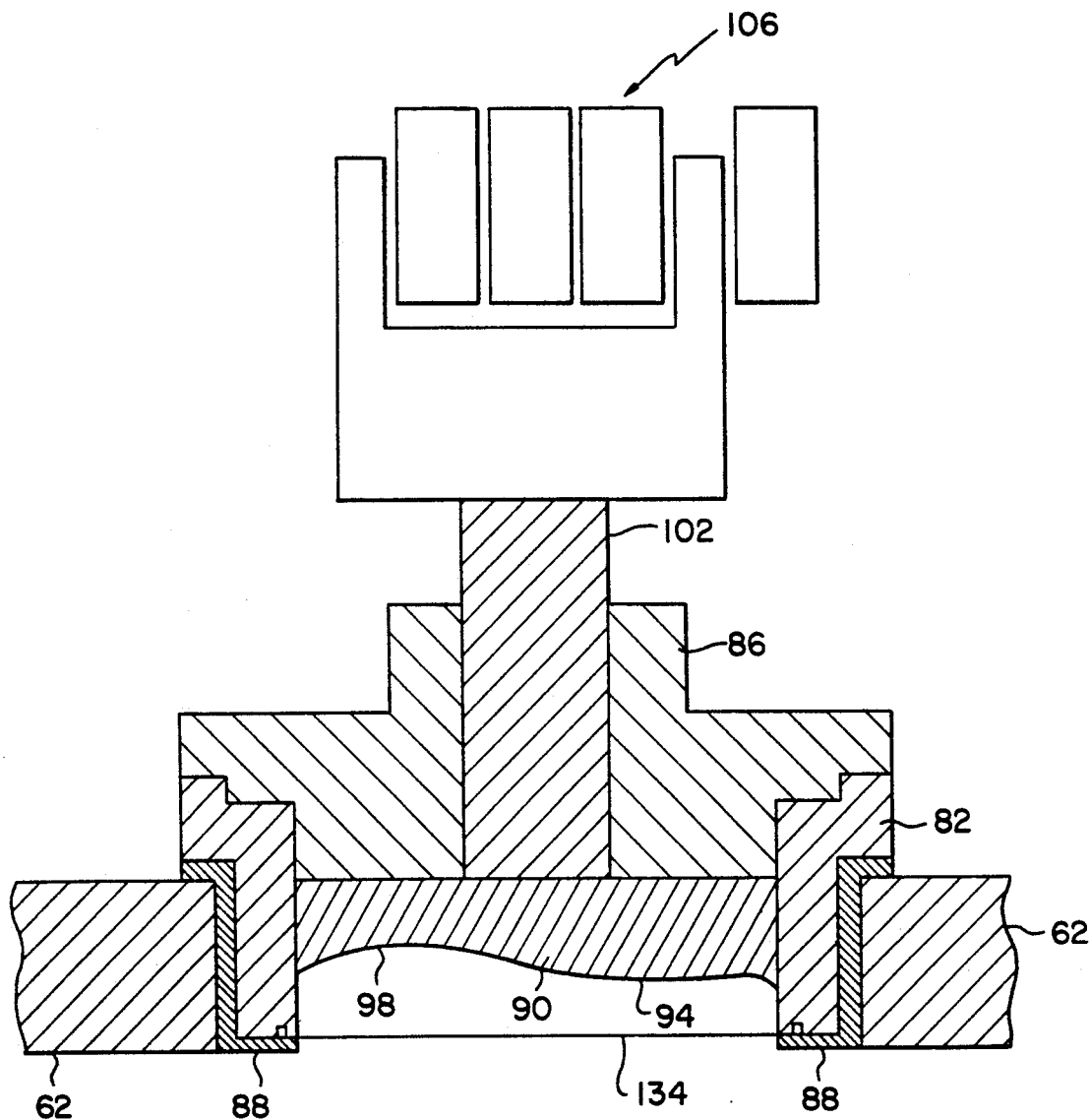
FIG. 12A is a cross-sectional view of one embodiment of a forming station prior to being rotated over an infeed manifold
Figure 12B:
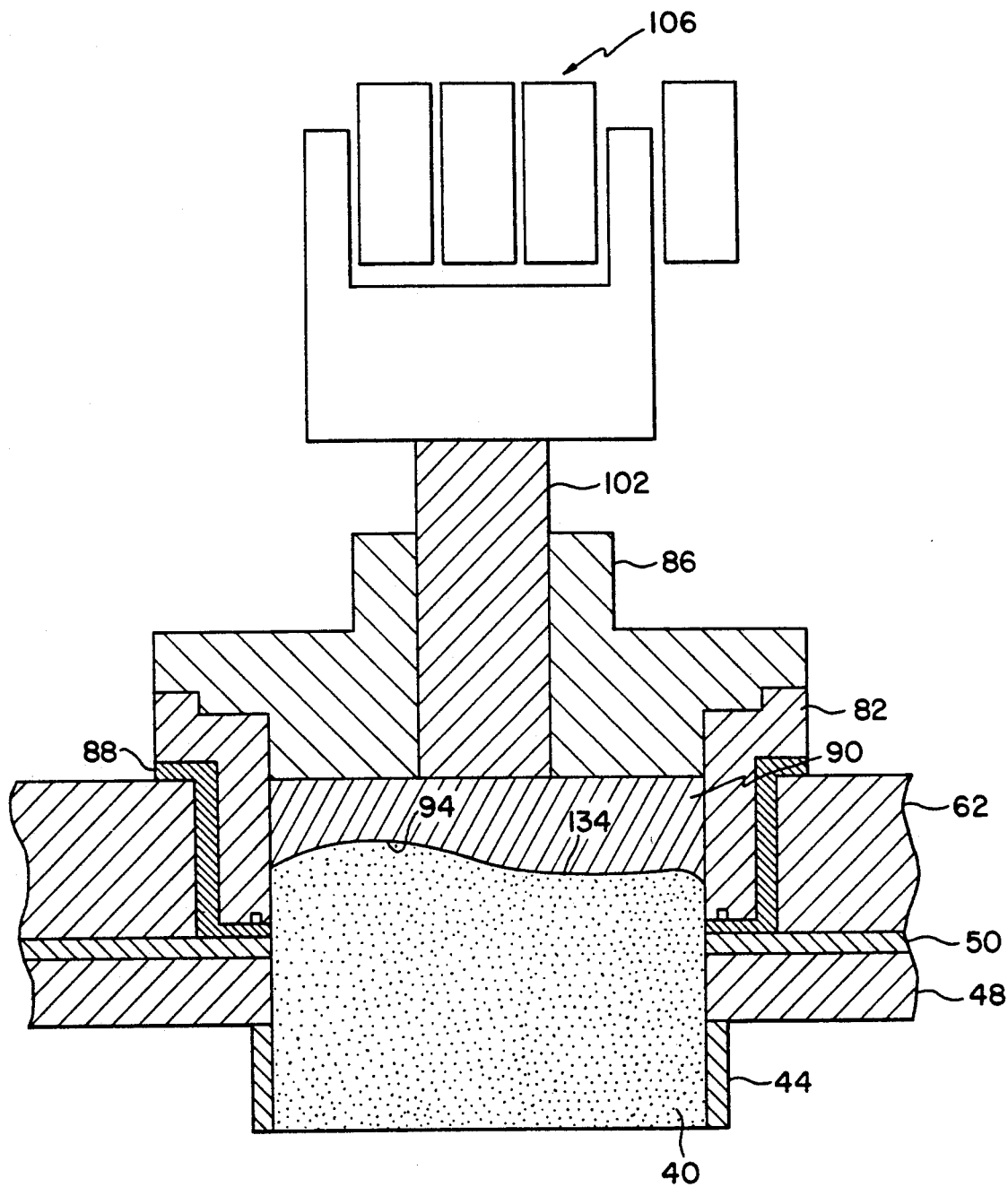
FIG. 12B is a cross-sectional view of the forming station of FIG. 12A in alignment with one embodiment of an infeed manifold, the product having forced the membrane to conform with the contour of the piston face.

Referring to FIG. 12A, the piston 90 is illustrated as being slightly above the bottom of the cavity plate 62 and the membrane 134 is in an undeformed state. In the event that the piston 90 was reciprocable relative to the forming cavity 74, the piston 90 would be maintained in a similar position by the engagement of its associated roller assembly 106 with the lift cam 114 (FIGS. 2-3) as noted above, but would have a clearance between its upper portion and the cavity cap 86 to move upwardly when receiving raw food material. When the forming station 70 is rotated over the infeed manifold 48 as illustrated in FIG. 12B, raw food material 40 is provided to the forming cavity 74 under pressure such that the elastic membrane 134 is stretched to substantially conform to the three-dimensional contour of the piston face 98. As previously noted, this flow could also be used to advance the piston 90 upwardly within the forming cavity 74 until engagement with the portion control assembly 166 in the case of a reciprocable piston 90.

Figure 12C:
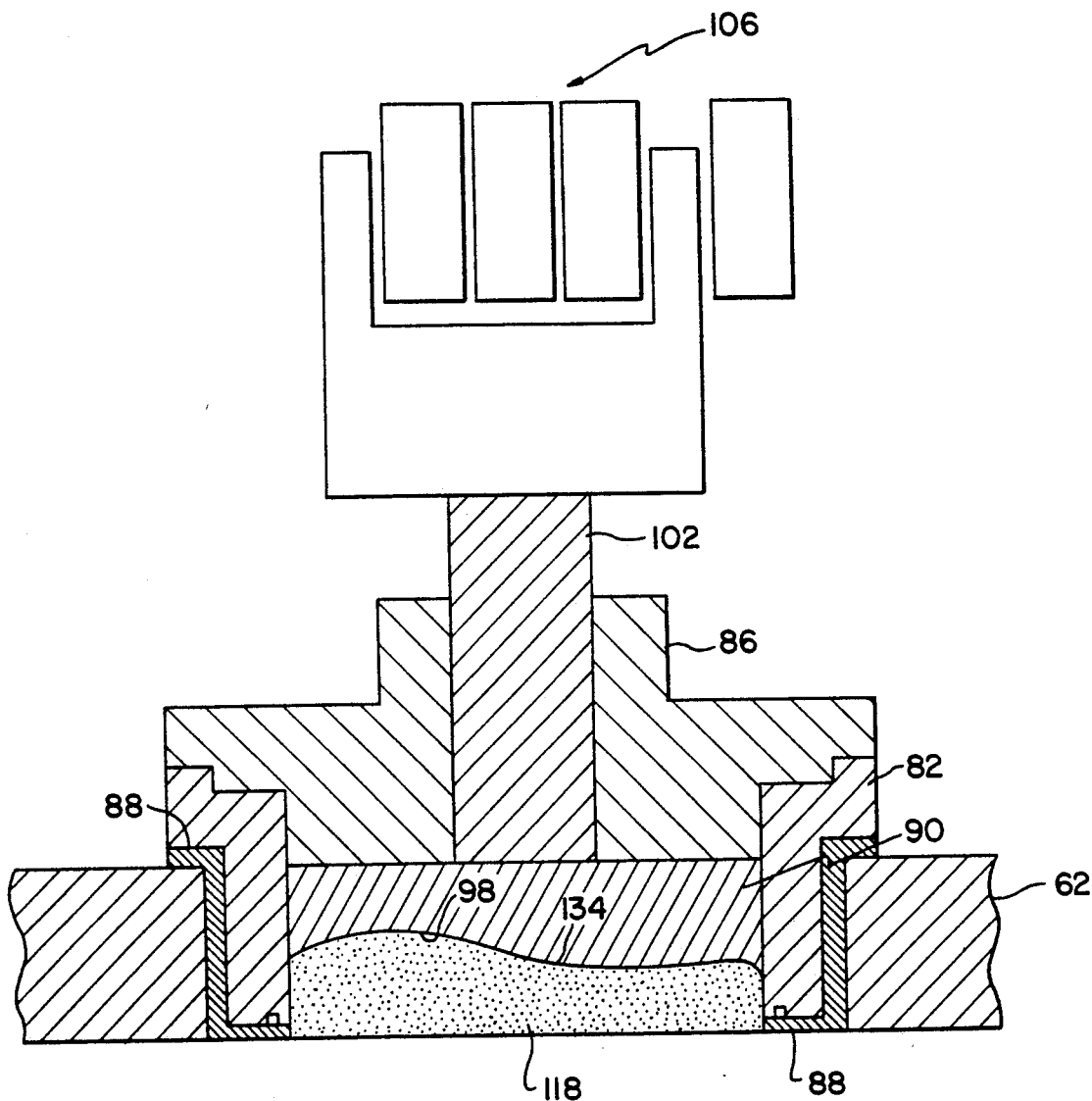
FIG. 12C is a cross-sectional view of the forming station of FIG. 12A having rotated out of alignment with the infeed manifold.

As the forming station 70 rotates out of alignment with the infeed manifold 48, the raw food material 40 is severed by the knife cut-off, and thus the product 118 is completely formed as illustrated in FIG. 12C. Since the forming station 70 rotates out of alignment with the seal plate 50 to expose the food product 118 within the forming cavity 74 at this time, the vacuum-assist system is activated by the pivoting of the vacuum-assist roller 190 associated with the particular forming station 70 due to engagement with the vacuum-assist cam 218 (FIGS. 3, 9A, 9B, 10-11). The membrane 134 is thus retained against the piston face 98, and the product 118 is maintained within the forming cavity 74. In order to reduce the potential for damage to the membrane 134, the vacuum may actually be drawn prior to initially rotating each forming station 70 over the seal plate 50 and/or infeed manifold 48 such that the membrane 134 will not catch/tear on the seal plate 50 and/or the infeed manifold 48.

Figure 12D:
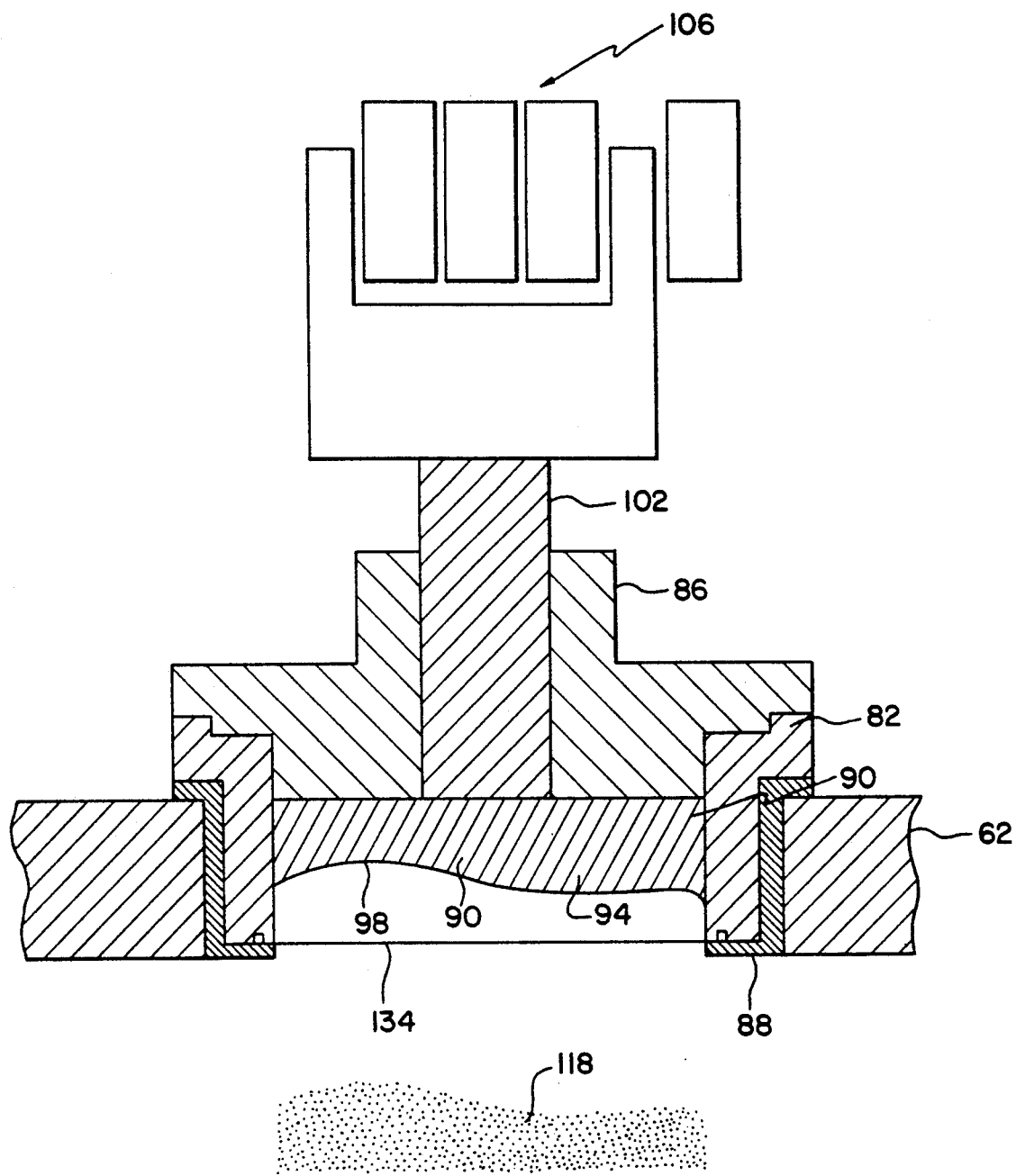
FIG. 12D is a cross-sectional view of the forming station of FIG. 12A ejecting the formed food product.

When the forming station 70 is rotated over a desired area, such as the spreader conveyor 226, the vacuum is released by the disengagement of the vacuum-assist roller 190 and the vacuum-assist cam 218. The elasticity of the membrane 134 thus moves the membrane 134 away from the piston face 98 to eject the product 118 from the forming cavity 74 as illustrated in FIG. 12D. In order to assist the membrane 134 in this movement, the forced-air system may be activated by a pivoting of the forced-air roller 186 by engagement with the forced-air cam 214. Therefore, forced air may be directed through the apertures 142 in the piston head 94 and/or the plunger 150 may be driven downwardly away from the piston face 98, either or both of which assists the membrane 134 in its movement away from the piston face 98 to eject the product from the forming cavity 74 in a more accurate manner, again although not shown in FIG. 12D.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention The embodiments described hereinabove are further intended to explain best modes known of practicing the invention and to enable others skilled in the art to utilize the invention in such or other embodiments, and with various modifications required by the particular applications or uses of the present invention. It is intended that the appended claims be construed to include alternative embodiments to the extent permitted by the prior art.

What is claimed is:

1. An apparatus for forming a three-dimensional food product from a raw food material, comprising
   means for receiving the raw food material;
   mold means, positioned in said means for receiving, for defining at least a portion of a contour of the three-dimensional food product, wherein at least a portion of said mold means has a three-dimensional contour and wherein said mold means comprises a piston, said piston being reciprocally positioned within said means for receiving; and
   a membrane positioned over said mold means, wherein the raw food material provided to said means for receiving substantially conforms said membrane to said contour of said mold means and thereby forms at least one three-dimensional surface for the food product, and wherein said membrane at least assists in ejecting the formed three-dimensional food product rom said mold means.

2. An apparatus, as claimed in claim 1, wherein:
   said means for receiving comprises a forming cavity having a sidewall, said sidewall defining a peripheral contour of the food product.

3. An apparatus, as claimed in claim 1, wherein:
   said mold means comprises means for directing forced air against said membrane to force said membrane away from said contour of said mold means.

4. An apparatus, as claimed in claim 1, wherein:
   said mold means comprises means for drawing a vacuum to retain said membrane against said contour of said mold means.

5. An apparatus, as claimed in claim 1, wherein:
   said mold means comprises plunger means to force said membrane away from said contour of said mold means.

6. An apparatus, as claimed in claim 5, wherein:
   an external surface of said plunger means defines a portion of said three-dimensional contour of said mold means.

7. An apparatus, as claimed in claim 6, wherein:
said plunger means is reciprocable relative to said mold means between at least first and second positions, said plunger means being substantially flushly positioned with said contour of said mold means in said first position, said plunger means being displaced outwardly from said contour in said second position.

8. An apparatus, as claimed in claim 1, wherein:
at least a portion of said contour of said mold means is concavely shaped.

9. An apparatus, as claimed in claim 1, wherein:
said membrane comprises polyisoprene rubber.

10. An apparatus, as claimed in claim 1, further comprising mounting means for maintaining a peripheral portion of said membrane substantially stationary relative to an interior portion of said membrane during the provision of raw food material to said means for receiving.

11. An apparatus, as claimed in claim 1, further comprising:
a rotatable turret having a plurality of circumferentially-spaced forming stations, each said forming station comprising said means for receiving, said mold means, and said membrane.

12. An apparatus for forming a three-dimensional food product from a raw food material, comprising:
inlet means for containing a supply of the raw food material; and
a rotatable turret, said turret having a plurality of forming stations positioned about a rotational axis of said turret and alignable with said inlet means, each said forming station comprising:
forming cavity means for receiving a quantity of the raw food material from said inlet means when rotated into alignment therewith;
piston means positioned within said forming cavity means, wherein at least a portion of a face of said piston means has a three-dimensional contour; and
a membrane positioned over said face of said piston means, wherein the raw food material provided to said forming cavity means causes said membrane to substantially conform to said contour of said face to thereby form at least one three-dimensional surface for the food product, and wherein said membrane assists in separating the food product from said face of said piston means.

13. An apparatus, as claimed in claim 12, wherein:
said inlet means is positioned a first distance above a support surface, and wherein said turret is positioned a second distance above said support surface, said second distance being greater than said first distance.

14. An apparatus, as claimed in claim 12, further comprising:
means for introducing the raw food material into said inlet means under pressure.

15. An apparatus, as claimed in claim 12, wherein:
a perimeter of said forming cavity means is shaped to define a perimeter of the food product.

16. An apparatus, as claimed in claim 12, wherein:
said piston means comprises means for forcing air against said membrane to move said membrane away from said face of said piston means.

17. An apparatus, as claimed in claim 12, wherein:
said piston means comprises means for drawing a vacuum to substantially retain said membrane against said face of said piston means.

18. An apparatus, as claimed in claim 12, wherein:
said piston means is reciprocable within said forming cavity.

19. An apparatus, as claimed in claim 12, wherein:
said piston means comprises plunger means for moving said membrane away from said face of said piston means.

20. An apparatus, as claimed in claim 19, wherein:
said plunger means is reciprocable relative to said piston means.

21. An apparatus, as claimed in claim 19, wherein:
a face of said plunger means defines a portion of said three-dimensional contour of said face of said piston means.

22. An apparatus, as claimed in claim 12, wherein:
at least a portion of said face of said piston means is concavely shaped.

23. An apparatus, as claimed in claim 12, wherein:
said membrane comprises a material having an elasticity, wherein said membrane stretches to substantially conform to said face of said piston means to thereby form at least one three-dimensional surface for the food product, and wherein said elasticity of said membrane at least in part forces the food product away from said face of said piston means.

24. An apparatus, as claimed in claim 12, wherein:
said membrane comprises polyisoprene rubber.

25. An apparatus, as claimed in claim 12, wherein:
a peripheral portion of said membrane is stationary relative to an interior portion of said membrane.

26. An apparatus, as claimed in claim 12, further comprising:
product transfer means for transferring the formed product from said apparatus.

27. An apparatus, as claimed in claim 26, wherein:
said product transfer means has a longitudinal axis, and wherein said elasticity of said membrane and at least one of a forced air means for moving said membrane away from said face of said piston means and a reciprocable plunger means for moving said membrane away from said piston face positions the food product on said product transfer means substantially about said longitudinal axis.

28. A method for forming a three-dimensional food product, comprising the steps of:
providing a raw food material to a forming cavity means under pressure;
upwardly stretching a membrane, positioned over a mold means, with said raw food material, said mold means being positioned within said forming cavity means and having a three-dimensional contour;
substantially conforming said membrane to said contour of said mold means with said pressurized raw food material to form at least one three-dimensional surface of the food product;
drawing a vacuum in said forming cavity means;
positioning said forming cavity means over a deposit area;
releasing said vacuum; and
contracting said membrane to eject the formed three-dimensional food product from said forming cavity means onto said deposit area.

29. A method, as claimed in claim 28, further comprising the step of:
injecting air against said membrane to assist in the ejection of the formed three-dimensional food product from said forming cavity means onto said deposit area.

30. A method, as claimed in claim 28, further comprising the step of:
forcing a plunger means reciprocally positioned within said mold means against said membrane to assist in the ejection of the formed three-dimensional food product from said forming cavity means onto said deposit area.

31. An apparatus for forming a three-dimensional food product from a raw food material comprising;
means for receiving the raw food material;
mold means positioned in said means for receiving, wherein at least a portion of said mold means has a three-dimensional contour;
a membrane positioned over said mold means and having an elasticity; and
means for drawing a vacuum in at least a portion of said mold means, wherein the raw food material provided to said means for receiving stretches said membrane to substantially conform to said contour of said mold means and thereby forms at least one three-dimensional surface for the food product, said membrane being substantially retained against said contour of said mold means by said means for drawing a vacuum, and wherein the food product is ejected from said mold means at least in part by said elasticity of said membrane.

32. An apparatus for forming a three-dimensional food product from a raw food material, comprising:
means for receiving the raw food material;
mold means positioned in said means for receiving, wherein at least a portion of said mold means has a three-dimensional contour;
a membrane positioned over said mold means and having an elasticity; and
a plunger means associated with said mold means, wherein the raw food material provided to said means for receiving stretches said membrane to substantially conform to said contour of said mold means and thereby forms at least one three-dimensional surface for the food product, and wherein the food product is ejected from said mold means at least in part by said elasticity of said membrane, said plunger means forcing said membrane away from said contour of said mold means.

33. An apparatus, as claimed in claim 32, wherein:
an external surface of said plunger means defines a portion of said three-dimensional contour of said mold means.

34. An apparatus, as claimed in claim 32, wherein:
said plunger means is reciprocable relative to said mold means between at least first and second positions, said plunger means being substantially flushly positioned with said contour of said mold means in said first position, said plunger means being displaced outwardly from said contour in said second position.

35. An apparatus for forming a three-dimensional food product from a raw food material, comprising;
means for receiving the raw food material;
mold means positioned in said means for receiving, wherein at least a portion of said mold means has a three-dimensional contour;
a membrane positioned over said mold means and having an elasticity, wherein the raw food material provided to said means for receiving stretches said membrane to substantially conform to said contour of said mold means and thereby forms at least one three-dimensional surface for the food products; and mounting means for maintaining a peripheral portion of said membrane substantially stationary relative to an interior portion of said membrane during the provision of raw food material to said means for receiving, and wherein the food product is ejected from said mold means at least in part by said elasticity of said membrane.

36. An apparatus for forming a three-dimensional food product from a raw food material, comprising;
means for receiving the raw food material;
mold means positioned in said means for receiving, wherein at least a portion of said mold means has a three-dimensional contour;
a membrane positioned over said mold means and having an elasticity, wherein the raw food material provided to said means for receiving stretches said membrane to substantially conform to said contour of said mold means and thereby forms at least one three-dimensional surface for the food product, and wherein the food product is ejected from said mold means at least in part by said elasticity of said membrane; and
a rotatable turret having a plurality of circumferentially-spaced forming stations, each said forming station comprising said means for receiving, said mold means, and said membrane.

37. An apparatus for forming a three-dimensional food product from a raw food material, comprising:
an inlet means for containing a supply of the raw food material;
a support member having a plurality of forming stations positioned thereon;
means for moving said support member to align said forming stations with said inlet means, each said forming station comprising:
forming cavity means for receiving a quantity of the raw food material from said inlet means when moved into alignment therewith;
piston means positioned within said forming cavity means for defining at least a portion of a contour of the three-dimensional food product, wherein at least a portion of a face of said piston means has a three-dimensional contour; and
a membrane positioned over said face of said piston means, wherein the raw food material provided to said forming cavity means causes said membrane to substantially conform to said contour of said face of said piston means to thereby form at least one three-dimensional surface for the food product, and wherein said membrane assists in separating the food product from said face of said piston means.

38. A method for forming a three-dimensional food product utilizing an infeed station, forming cavity, mold, and membrane, said infeed station having a supply of a pumpable raw food material, said mold being positioned within said forming cavity and at least a portion of aid mold having a three-dimensional contour, said membrane being positioned over said mold, said method comprising the steps of:
moving said forming cavity into alignment with said infeed station;
providing a flow of the pumpable raw food material to said forming cavity;
substantially conforming said membrane to said contour of said mold with said flow of the pumpable raw food material to form at least one three-dimensional surface of the food product;
moving said forming cavity over a deposit area after said substantially conforming,said membrane step; and
ejecting the formed three-dimensional food product from said forming cavity onto said deposit area.

* * * * *